Feb. 26, 1946. E. A. CHMIELEWSKI 2,395,723
WELDING METHOD AND APPARATUS
Filed July 20, 1942 3 Sheets-Sheet 2

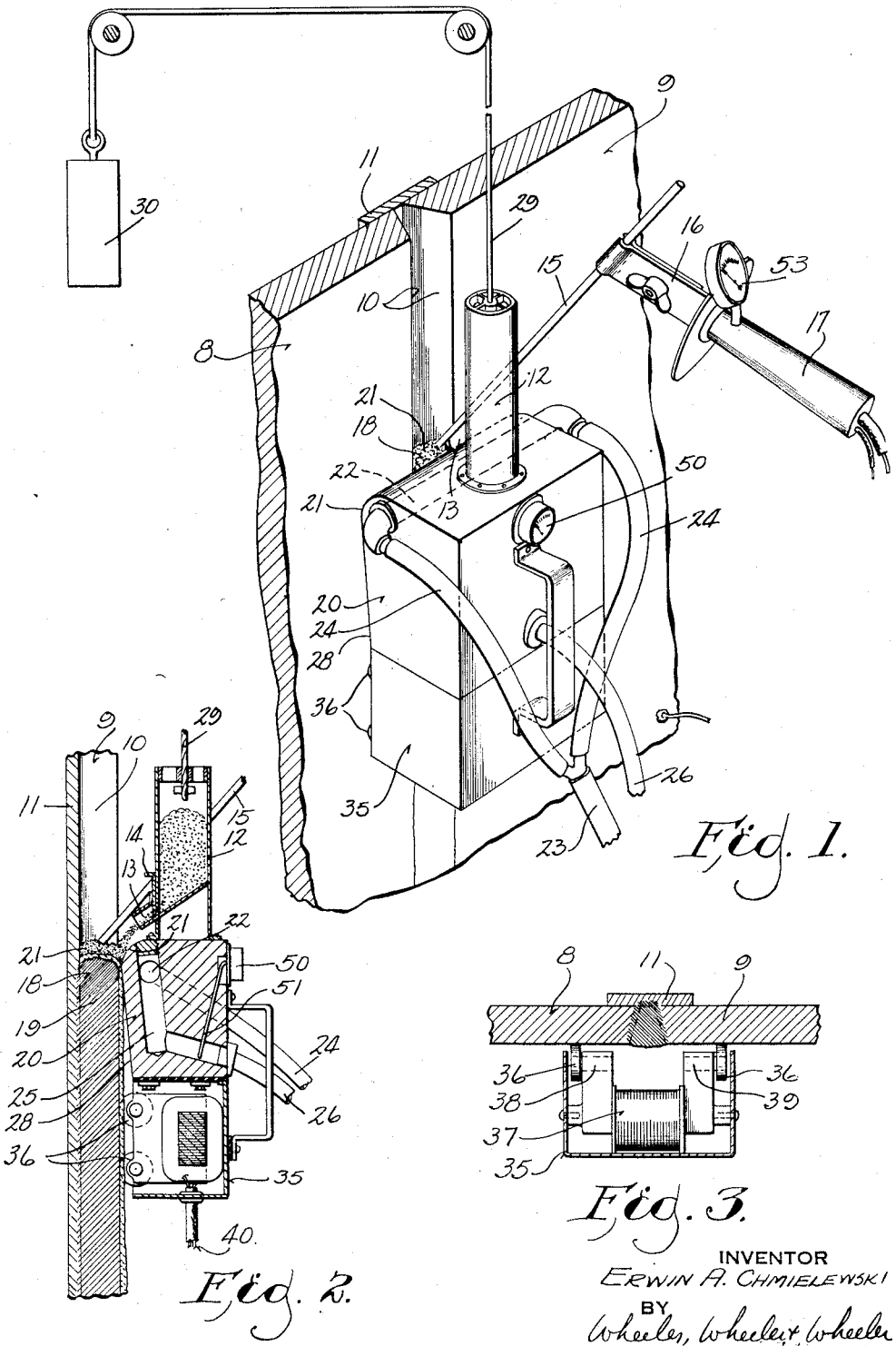

INVENTOR
ERWIN A. CHMIELEWSKI
BY
Wheeler, Wheeler & Wheeler
ATTORNEYS.

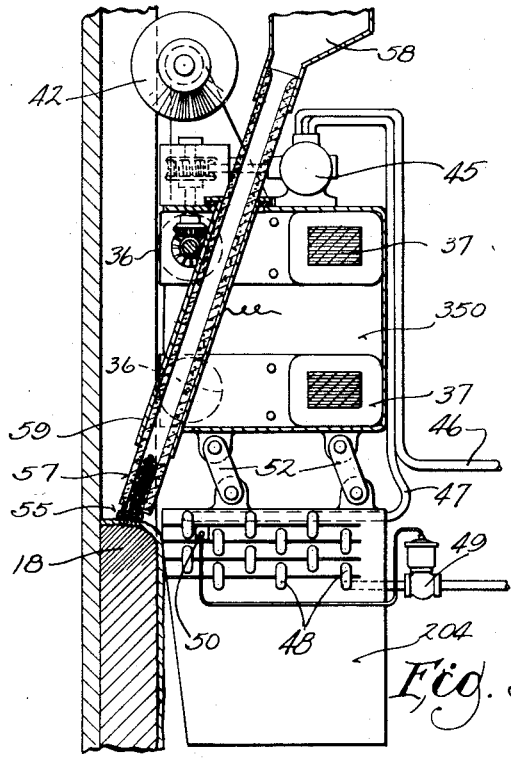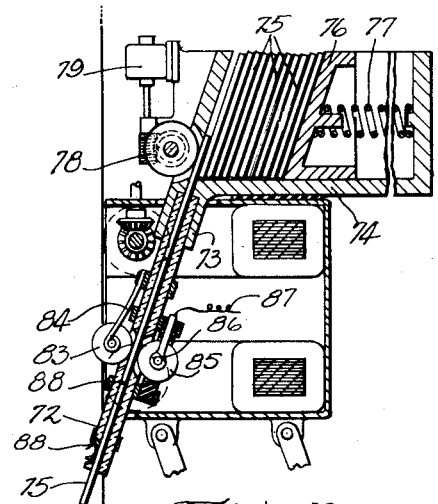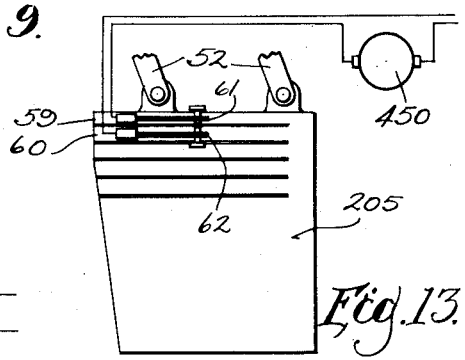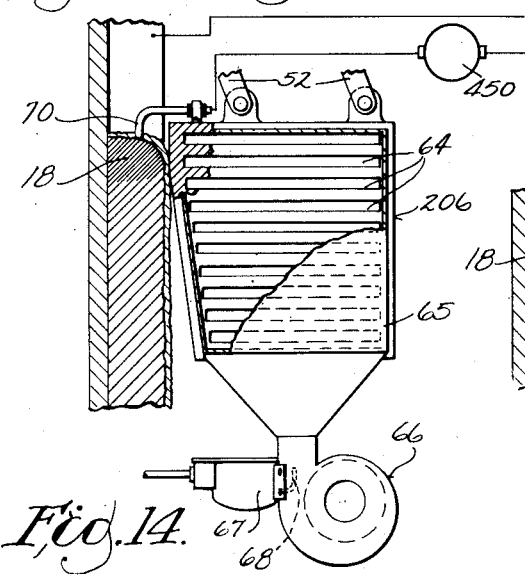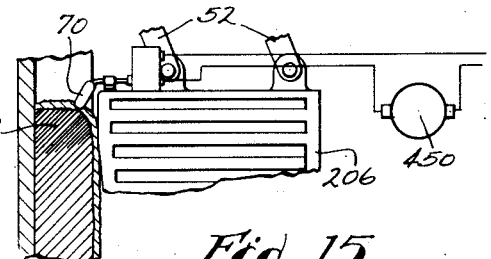

Patented Feb. 26, 1946

2,395,723

UNITED STATES PATENT OFFICE 2,395,723

WELDING METHOD AND APPARATUS

Erwin A. Chmielewski, Milwaukee, Wis.

Application July 20, 1942, Serial No. 451,584

20 Claims. (Cl. 219—10)

This invention relates to improvements in welding methods and apparatus.

Broadly it is the primary object of the invention to provide a novel and simplified means and procedure for continuous welding, particularly as applied to vertical joints but useful in other welding problems and positions.

More specifically, it is an important object of the invention to provide for the use of higher temperatures in welding with improved temperature control by the operator. According to present practice high skill is required to control temperature and a joint is welded by what amounts to a series of successive deposits of weld material and flux at intervals such that the temperature will not rise so high as to cause molten material to flow from the joint. It is desirable that the temperature should be as high as the working conditions permit because a high temperature tends to effect a more perfect exclusion of slag from the joint than is obtainable at low temperatures. However, particularly in vertical joints, it has not been possible to raise the temperatures to adequate levels without discharging molten material from the joint. I propose to abstract heat from the surface of the weld artificially at a rate higher than heat rejection can occur either to the atmosphere or to the parts which are being joined by the welding operation. By so doing, I can maintain the puddle in the joint at a greatly increased temperature to yield a more perfect weld, from the surface of which the slag can readily be chipped.

Moreover, what is extremely important, I seek to make the deposit of weld material in the joint substantially continuous, rather than intermittent, thereby greatly improving the weld.

Another important object of the invention is the elimination of warpage.

Another of my objectives is to eliminate the necessity for preliminary beveling of the work to be welded, and to eliminate the dams or stops heretofore used to hold the molten weld metal during the welding of a vertical joint. It is a further object of the invention to improve the character of the weld and to enable it to be made either flush or convex for reinforcing purposes at the option of the operator and to produce a more homogeneous weld with slag and porosity largely eliminated.

It is a further important object of the invention to expedite a welding operation and to eliminate in large part the high degree of skill heretofore required where the joint has been vertical or otherwise difficult.

While my method and some of the apparatus herein disclosed may be manually controlled, it is a further object of the invention to provide novel and improved means for automatic welding and to provide novel and improved apparatus for holding my chilling block to the work and for regulating its advance automatically as the weld is formed. I propose to accomplish these either thermostatically or by a suitable electric contact.

An additional very important object of the invention has to do with the provision of welding material (and flux where desired) in the form of pellets either to supplement or entirely to replace the supply of such material from the weld rod, thereby greatly expediting the work and making possible the use of weld rods which are not used up so rapidly. Under certain circumstances I propose to use a carbon electrode and in that connection it is an object of the invention to provide for the cooling of the electrode by the welding material as such material is fed along the electrode to the pellet.

Other objects will be apparent to those skilled in the art upon examination of the following disclosure of my invention.

In the drawings:

Fig. 1 is a view in perspective showing a preferred form of welding apparatus in use on a conventional pre-beveled joint.

Fig. 2 is a detail view taken in section through the apparatus in a vertical plane passing through the joint.

Fig. 3 is a horizontal section through the carriage optionally employed for assisting in the positioning and guiding of my welding equipment.

Fig. 9 is a view in vertical section diagrammatically illustrating apparatus for automatic welding in accordance with this invention.

Fig. 10 is a fragmentary detail in section showing a modified feed for weld metal usable in the general organization of Fig. 9.

Fig. 11 is a detail in side elevation of weld metal pellets.

Fig. 12 is a view of such pellets coated with flux, the flux being shown in section.

Fig. 13 is a fragmentary detail in side elevation, of parts adapted to be substituted in a device similar to that of Fig. 9 to convert such device for electrical operation.

Fig. 14 is a view partially in side elevation and partially broken away in section, fragmentarily illustrating another substitute cooling member usable in the general organization of Fig. 9 and providing for electric propulsion with non-thermostatic control.

Fig. 15 is a view similar to Fig. 14 fragmentarily illustrating a thermostat substituted for the contact.

Like parts are identified by the same reference characters throughout the several views.

Figure 4:
Figs. 4 and 5 are views in horizontal section through the joint as welded, illustrating optional forms which the weld may take.

Referring to Fig. 1, it will be noted that the plates 8 and 9 have been prepared for welding in accordance with conventional practice, by beveling their corners at 10 and closing the gap between their margins with a backing strip 11. These preliminary steps are not necessary in the use of my invention as will hereinafter be explained, but my invention is also applicable where the work has thus been prepared in accordance with conventional practice.

It will be understood that my invention is very well adapted for mechanical and automatic welding as well as for hand welding.

The weld rod 15 serves as an electrode and is supported and guided by the clamp 16 with which handle 17 is provided. While the electrode 15 may be a flux coated weld rod, it will be understood that both the flux and some or all of the welding material may be separately provided if desired, in which case the member 15 may comprise merely an electrode.

Regardless of how the welding material and flux are supplied, the heat of the electric arc between the electrode 15 and the work will melt the welding material in the joint between the margins of the plates 8 and 9, creating a puddle of molten material at 18 which will be dammed at the rear by the continuous strip 11. In accordance with the present invention the molten material comprising the puddle 18 will be caused to congeal at 19 (Fig. 2) due to the absorption of heat therefrom by a heat absorbent block 20 of material having high heat conductivity. This block may be of any desired form but for purposes of a butt weld such as that shown on Fig. 1, the block is preferably rectangular transversely of its face. Its upper corner may be beveled to facilitate the introduction of the electrode or welding rod 15 which should project into a body of molten flux 21 resting upon the puddle 18 of molten weld material.

While any metal of relatively high melting point and high heat conductivity may be used for the heat absorber 20, copper has been found to be particularly satisfactory. Brass is also good for general service. Silver, aluminum, and other metals may also be used under proper circumstances. The block has sufficient mass so that its capacity for heat absorption is comparatively large and its surface for heat radiation is correspondingly large. For this reason it will not, in a joint of ordinary length, require special cooling. However, for many purposes, and particularly where the joint is a long one, it is desired that the block 20 be cooled in order that the welding operation may be substantially continuous in accordance with the contemplation of this invention.

For cooling the block I provide a cross bore 22 for liquid coolant such as water. The water supply hose 23 has branch pipes 24 leading to the two ends of the duct 22, the water return occurring through a conduit 25 with which the return hose 26 communicates. Conduit 25 preferably opens approximately from the center of conduit 22, directly opposite the weld and preferably extends downwardly along the weld. Assuming that the corner surface of the block is truly cylindrical, the cross bore 22 for the coolant may be at the axis about which the cylindrical corner surface is formed. In any event, the cross bore 22 will be quite close to the point where the block engages the hot molten welding material.

Below the contact surface 21 of the block 20, the block is preferably relieved at 28, diverging somewhat from the plane of the plates 8 and 9 between which the weld is being formed. Assuming that the block is heavy, it may be supported by a cable 29 operating over suitable pulleys, where needed, and counterbalanced, as by weight 30. Where the block is unwieldy I may further use, if desired, an underlying carriage 35 to facilitate guiding the block and holding it tightly to the work. This underlying carriage is provided with casters at 36 for riding on the surfaces of plates 8 and 9. An electro-magnet 37 within the carriage has its poles 38 and 39 in immediate proximity to the plates 8 and 9, so that, when the magnet is energized the carriage will be held to the work and will maintain the heat absorbing block 20 in operative proximity to the work. A suitable cable 40 supplies the electro-magnet with current.

To allow clearance for slag the entire heat absorbing block is preferably spaced slightly from the surfaces of the parts 8 and 9 which are being joined by welding. The spacing will be determined by the carriage 35 and, more particularly, by the rollers 36 thereof. While reference has been made to contact between the chilling block 20 and the molten weld metal, the fact is that due to the high temperature at which the puddle 18 of weld metal is maintained, the molten slag is ejected from the puddle and lies between the heat absorbing block 20 and the refined weld metal. It is the slag, rather than the weld metal itself, which is chilled with sufficient rapidity to congeal and form a progressively advancing dam behind which the weld more slowly congeals, with a puddle of molten weld metal constantly maintained in a continuously advancing position at the surface of the weld.

Figure 5:
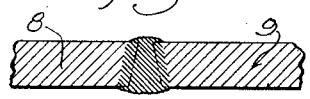

If the heat absorber 20 is advanced relatively slowly along the joint, the point at which the slag congeals will be rather high on the block 20 where the clearance between the block and the work is at a minimum. This will hold the slag close to the plane of the work surfaces so that when it is chipped off the resulting weld will be flush as indicated in Fig. 4. If the block is advanced more rapidly along the joint, the congealing of the slag will occur low down on the block where the clearance is greater and the resulting weld, after the slag is chipped off, will take the form of a reinforced weld as shown in Fig. 5.

In either event, due in part to the continuity of the operation and due in part to the tendency of the slag to congeal at the surface of the block 20, the result will be a weld of exceptional homogeneity and one which is exceptionally free of pores and has exceptional strength.

Where the weld rod is not provided with a coating or core of flux, or where additional flux or additional weld metal must be added (the addition of weld metal being a supplemental means of temperature control), I may provide the block 20 with a superposed chamber 12 for flux or weld metal or both, from which chamber a spout 13 controlled by a valve 14 is arranged to deliver the material into the joint closely adjacent to the point where the heat is developed.

As already initmated, it is not necessary that the work be beveled as at 10. Neither is it necessary that the backing strip 11 be employed, since a heat abstracting block exactly like that used at the front of the work may be correspondingly moved upwardly behind the work at the same level to chill the molten weld material in the puddle 18 at the rear face of the work in exactly the same manner in which it is chilled at the front of the work as above described.

Figure 6:
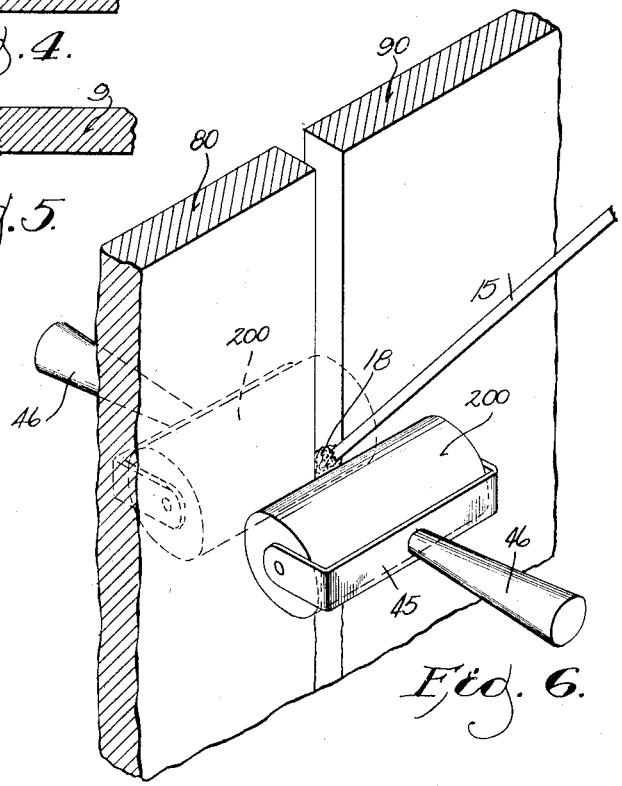
Fig. 6 is a view in perspective illustrating the use of a modified embodiment of the apparatus and further illustrating how the method and apparatus are applicable to work which has not been pre-beveled.

This is illustrated, and at the same time a chilling block suitable for use in small jobs is illustrated in Fig. 6. The plates 80 and 90 have not been beveled at 10, and the extent of the joint is sufficiently short so that the heat absorbing blocks 200 can chill the weld throughout the length of the joint without requiring cooling by a circulating coolant. In this instance the blocks 200 take the form of copper rollers rotatably mounted in yokes 45 provided with handles 46, it being understood that any of these devices may be used in automatic welding equipment where desired. In use of the apparatus shown in Fig. 6, the electrode 15 is moved gradually upwardly along the vertical joint, and the welding material and flux continuously supplied to the joint create a puddle 18 of molten material which is continuously or substantially continuously established at successively higher levels, the surface of the puddle at each successive level being chilled to provide the damming "skin" by congealing the molten metal due to abstraction of heat therefrom into the blocks or rollers 200.

By forming the blocks into special shapes any heating problem can be met. For example, in Fig. 7 the operation of making a corner weld is illustrated. The plates 81 and 91 are set corner to corner with their inner face margins in line contact and their outer face margins spaced. A specially shaped heat absorbing block 201 has surfaces registering with the outer faces of plates 81 and 91, thereby enclosing the puddle 18 of molten material and slag which is formed in the rectangular space between the ends of plates 81 and 91 and the faces of the heat absorbing block 201.

Figure 7:
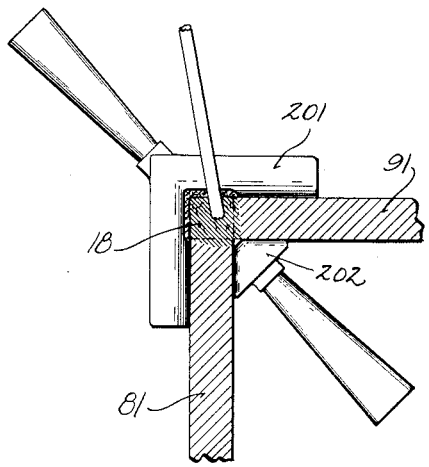
Fig. 7 is a view in horizontal section illustrating in plan apparatus specifically designed for making a corner weld.

To accommodate the slag, the heat absorbing block 201 is cut away in the immediate vicinity of the joint, as is clearly illustrated in Fig. 7.

Particularly in view of the high temperatures employed in accordance with the present invention, the corners of the plates 81 and 91 would be speedily melted out or burned away to release the molten material in puddle 18 were it not for the provision of a heat absorbing block 202 which is triangular in section to fit into the corner between the plates, thereby not only absorbing heat from the plates themselves but congealing the molten material in the corner of the weld.

Figure 8:
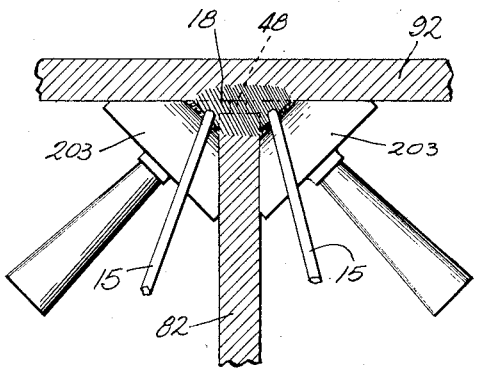
Fig. 8 is a detail view in horizontal section through work which is being fillet welded, illustrating modified embodiments of my invention specially designed for this purpose.

To make a T weld or fillet weld connecting plate 82 to plate 92 at right angles as shown in Fig. 8, it is not necessary to bevel the margin of plate 82. Instead, I prefer to use small spacers 48 wherever needed to maintain the margin of plate 82 at a fixed distance from the surface of plate 92. At either side of the joint heat absorbing blocks 203 are positioned, these blocks being identical and provided with beveled corners abutting the faces of the respective plates. The size of the blocks 203 is preferably such that these blocks will be spaced from the joint sufficiently to allow the puddle of molten weld material to form the desired fillet at each side of the joint. As the welding operation progresses, the spacers 48 will melt, as will the contiguous portions of the respective plates 82 and 92, with the result that in practice, at the relatively high temperatures employed, the puddle will tend to assume the proportions indicated at 18 in Fig. 8.

Since the process as above described tends to collect the greater portion of all slag in the "skin" which forms at the surface of the puddle due to the abstraction of heat therefrom, the resulting weld has most of its slag content exposed where it can readily be chipped or ground off, leaving a joint of substantially pure metal and one which is substantially homogeneous and free of blow holes and slag.

The molten iron and slag do not adhere to the heat absorbing block 20.

The function of the block 20 is not the same as the function of a strip such as that shown at 11. The rate of heat absorption into the strip 11, assuming such strip to be of ferrous material, is no greater, if as great, as the rate of heat absorption into the parts 8 and 9 which are being welded. However, the rate of heat absorption into the block 20 is very much greater than the rate of heat absorption into the parts 8 and 9, and instead of the block 20 constituting in and of itself a dam to retain the puddle, the block 20 congeals a portion of the molten material (the congealed portion usually consisting primarily of slag), and it is the congealed "skin" of such material which constitutes the retaining wall behind which the welding material remains molten for an appreciable period before sufficient heat is absorbed into the parts 8 and 9 to effect the congealing thereof.

Since the present invention contemplates the continuous and substantially constant withdrawal of heat from the weld at a rate which is independent of atmospheric conditions and in some measure independent of the character of the work, and since the invention contemplates carrying the puddle of welding metal at temperatures in excess of those normally used heretofore, the degree of skill required to weld in accordance with the present invention is less than that required for the practice of welding by a means heretofore known. The invention further contemplates that the skill requirements may be further reduced and, in fact, the entire operation can be made automatic if the method is such that the rate of advance of the block 20 is proportioned to the temperature which is a function of the use of the block, provided further that the rate of feeding the weld rod to the joint is proportioned to the voltage of the current which supplies the arc.

With respect to the control of the rate of block movement in accordance with temperature, it is obviously immaterial in any broad sense whether the temperature measured is the temperature of the metal of the block, or whether it is the temperature of the coolant leaving the block through the conduit 25. Both temperatures are a function of the rate at which the block may properly be advanced to produce the desired result in relation to the temperature of the puddle of weld metal. If the temperature of the puddle rises, the temperature of the block will increase and there will be a corresponding increase (though at probably a different rate) in the temperature of the discharged coolant. This will indicate that the block is being moved too rapidly and its movement should be slowed to enable it to remove more heat from the puddle in a given period of time. On the other hand, if the temperature of the coolant or the block falls, this is an indication that the temperature of the puddle is falling due to the abstraction of too much heat therefrom, and the rate of movement of the block should be correspondingly accelerated.

For the guidance of the operator a thermometer 50 may be mounted on the face of the block adjacent the handle with a bulb 51 projecting into the block or, as shown, into the coolant. An operator told what temperature to maintain at the thermometer 50 can keep such temperature at constant or substantially so by simply advancing the block at a rate inversely proportionate to changes of temperature, thereby producing uniform work results so far as block movement is concerned.

If the weld rod is fed too rapidly to the puddle the length of the arc will be decreased and the voltage across the arc will sustain a corresponding decrease which will result in a decrease in temperature. If the weld rod is being fed too slowly the length of the arc will increase (until it is ultimately broken). During its increase the voltage across the arc will be increased. By supplying a voltmeter at 53 operatively connected across the arc, it is possible for the operator to feed his weld rod or electrode toward the puddle at a rate which is proportioned to the voltage, thereby maintaining his arc temperature approximately constant. As above indicated, my improved method contemplates the use of these control steps either independently or in conjunction with each other or in conjunction with the other features of the invention.

For automatic operation the carriage 350 (Fig. 9) is preferably heavier than carriage 35, being provided with two electromagnets 37 each having its poles in proximity to the work and the carriage having suitable casters 36 riding on the face of the work and holding the poles slightly free of contact with the plates to be welded.

A beveled guide wheel 42 mounted on top of the carriage 350 fits within the open joint between the plates to be welded, thereby serving to cause the carriage to follow gradually along the joint. The carriage may be propelled by transmitting motion to at least one of the caster wheels 36 from a motor 45 which, in the Fig. 9 construction, may be assumed to be a fluid motor supplied with motor fluid through a pipe 46. The fluid outlet from the motor is delivered through pipe 47 to a series of cooling conduits 48 passing to and fro through the heat absorber 204 and finally emerging subject to control of a thermostatic valve 49. The thermostat bulb 50 which controls such valve may be located in one of a succession of laminae into which the the upper part of the heat absorbing block 204 is preferably divided by horizontal slots as shown. The slots prevent direct heat transmission from one lamination to another and the use of this feature is optional. The connection of the thermostat 50 to the valve 49 is such that as the puddle 18 of molten weld metal rises in the joint to the level of the lamination in which the thermostat is located, the increase in heat will open the valve 49, thus permitting increased flow of fluid not only through the cooling passages of the heat absorber 204, but also through the motor 45, thus simultaneously increasing the cooling of the heat absorber and increasing the rate of operation of the fluid motor 45 to advance the entire apparatus. As the rate of advance of the apparatus is increased, the lamination in which the thermostat 50 is located will be raised above the puddle and the resulting decrease in the heat to which it is exposed will allow the thermostatic valve 49 to close wholly or partially, thus terminating the more rapid advance above described, until the rise of the level of the puddle again causes an increased rate of advance. It will be apparent that in this manner the carriage and heat absorber 204 may be made to advance at a rate approximately corresponding to the rate at which the puddle moves in the joint.

The heat absorber may be conveniently held to the work by suspending it upon links 52 having a slight outward inclination from the carriage so that the weight of the heat absorber biases it toward the work. The amount of bias can readily be controlled by the angularity with which the links 52 are positioned.

In Fig. 9 I have also illustrated an alternative way of supplying weld metal automatically to the joint. Instead of using a coil of weld rod and feeding this to the joint as a flexible electrode, I propose to supply my weld metal in the form of pellets such as those shown at 55 in Fig. 11. If desired, these pellets may be provided with a coating 56 of flux as indicated in Fig. 12. In either case the pellets may be introduced into the joint as desired. One way of accomplishing this is to use a tubular carbon electrode 57. This electrode may extend downwardly between the poles of the magnets 37 of carriage 350, and may be provided at its upper end with a hopper 58 into which the pellets may be delivered for feeding through the tubular electrode to the puddle. To prevent the carbon electrode from becoming heated by its own resistance throughout its length, I prefer to envelop it with a sleeve 59 to which the welding current supply is connected and through which the tubular carbon electrode is frictionally adjustable downwardly as its end gradually becomes consumed. The pellets moving through the feed tube (whether or not this be an electrode) will cool the feed tube and at the same time the pellets will become preheated, thereby reducing the time which will be required to melt them when they reach the puddle. Both the cooling of the feed tube and the preheating of the weld material are desirable to expedite the welding operation.

It is desired that the feed tube project sufficiently close to the puddle so that the pellets 55 issuing from the electrode and floating on the surface of the puddle before becoming melted thereon, will automatically determine the flow of such pellets through the supply tube (in this case the electrode). Obviously, as the pellets are melted below the tube 57 they will no longer provide support for pellets within the tube, and consequently an additional number of pellets will flow from the tube until support and equilibrium are again established. It will be understood that conventional electrodes may be used if desired, and the employment of a member which constitutes both an electrode and a supply tube for the pellets is an optional feature.

Fig. 10 illustrates a different way of feeding weld metal to the puddle. In this instance the tube 72 may be of some material which is dielectric and yet heat resistant, like porcelain. At its upper end it is fastened in a socket provided at 73 in the bottom of a magazine 74 through which weld rod sections 75 are fed under pressure of a follower 76 urged toward the end of the magazine by a spring 77. Any other way of getting the sections of weld rod into the upper end of the tube will be satisfactory.

The weld rod entering the upper end of the tube is urged downwardly therein by a wheel 78 driven at a constant rate from the motor 79. The weld rod directly acted upon by the wheel 78 will propel those which are beyond it in the direction of advance through the tube 72.

At a point above the lower end of the tube 72 current is communicated to one of the series of weld rods 75, preferably the one next to the end of the series. A roller 83 under bias of its supporting spring 84 holds this weld rod tightly to an energizing roller 85 which is supplied with welding current by a brush 86 and wire 87. The respective rollers engage the weld rod through suitable notches in the sides of the tube 72. These rollers perform the function of energizing the weld rod lengths. Assuming that the current is supplied to the second last weld rod, a resistance weld will join it to the last weld rod in the series. A spring clip 88 engages the lowest length to keep the rods from falling from the open lower end of the tube.

When the weld rod material is thus fed in short lengths at a predetermined rate into the puddle and the arc welding outfit as a whole is advanced according to the advance of the puddle, the welding operation will be fully automatic.

In the arrangement shown in Fig. 13, an electric motor 450 is diagrammatically illustrated for the actuation of the carriage 350 instead of the fluid motor 45 shown in Fig. 9. It is desired to control the electric motor thermostatically without, however, limiting the device to operation at any particular temperature. Accordingly, the thermostat disclosed is one which uses a temperature differential between the top lamination 59 of the heat absorbing block 205 and the second lamination 60 thereof. A bi-metallic thermostat 61 is electrically insulated but in thermally conductive relation to the top lamination 59, while another thermostat 62 is similarly associated with the second lamination 60.

These thermostats have suitable contacts connected in series into the circuit of motor 450. In work where the temperature of the puddle is very high the contact carried by thermostatic bar 61 will be deflected from the position which it will occupy when the welding temperature is lower. In either case however, regardless of the weld temperature, the thermostat 62, which is closer to the puddle (and which consequently varies quite widely according to the relative position of lamination 60 respecting the puddle) will engage the contact of thermostat 61 according to the temperature differential between the laminae 59 and 60, thus enabling the device to maintain a predetermined relation to the puddle, moving upwardly as the puddle moves upwardly, as described in connection with Fig. 9.

Fig. 14 shows a modified arrangement both as to cooling and as to control of the alternative heat absorber 206. In this construction the heat absorber is provided with a series of transverse slots or other openings 64, which are all supplied with a cooling fluid by a manifold 65 at one side of the block. For example, the cooling fluid may be air impelled by a blower fan 66, but in addition I may incorporate atomized water into the air to any suitable arrangement such as the float chamber 67 and jet 68. The atomized water vaporizes when exposed to the heat of the absorber block 206 and the amount of heat thus taken up in the form of latent heat by the water greatly augments the cooling supplied by the air. The air and vapor may be discharged from the slot 64 at the opposite side of the block. In actual practice I have found that any water atomizing device is effective for cooling the absorber which is a feature of my invention. I have used an ordinary paint spray apparatus for this purpose with good results.

In order to control the rate of advance of the absorber when it is advanced automatically, as in the Fig. 9 construction, I may provide at 70 an electrical contact which is electrically insulated from the absorber and is connected in series with the motor 450 which propels the carriage upon which the absorber is suspended. This electrical contact is adjustably positioned to project from the absorber to a point immediately above the puddle 18. The pellets, particularly if coated with flux (whether or not the pellets are used), have little electrical conductivity, and when the contact 70 is engaged with the pellets there will be little current flowing to the actuating motor 450. However, as soon as the puddle rises to such a level with respect to the absorber that either the molten metal or the liquid slag touch the contact member 70 (one side of the circuit being grounded to the work) an appreciable current will immediately be communicated to the motor, which will advance the carriage and the absorber until the contact 70 is lifted from the puddle. The puddle has negligible electrical resistance. It is however, possible to adjust the electrical constants to make the motor respond only to direct contact with molten metal, the slag having somewhat higher resistance.

The member 70 may be regarded as a thermostat and will operate in much the same manner, as shown in Fig. 15. Instead of relying upon the electrical conductivity of the puddle, the thermostat of Fig. 15 relies on temperature to control the operation of the motor 450, starting the motor when it contacts any part of the puddle.

It will, of course, be appreciated by those skilled in the art that the various suggestions herein made are interchangeable in the sense that any cooling arrangement may be used in any of the devices, and any control may be used (either a bulb type thermostat or an electrical thermostat or an electrical contact, or a manual control). Likewise, any type of motor power may be used and any type of electrode. The various features of the invention are interchangeable and sufficient variety has been illustrated to exemplify the possibilities in this regard.

I claim:

1. The process of producing between spaced metal parts of upright disposition a weld of substantially pure homogeneous metal free of blow holes and slag, said method comprising the approximately continuous advance along the space between the parts to be welded of a highly heat conductive metal block spanning such space in spaced relation to the parts, the substantially continuous deposit of molten weld metal and flux in the space between such parts at a sufficiently high temperature so that the weld metal rejects the slag and lies in a slag covered puddle between said parts, maintaining the block in a position respecting the deposited molten weld metal to remove sufficient heat from the slag ejected from the weld metal to cause the congealing of such slag at the surface of the puddle, and the removal of the block from contact with congealed slag as soon as such slag has formed a skin sufficiently strong to retain the molten puddle behind it, whereby the congealing of the molten metal of the puddle proceeds normally without loss of heat to such block.

2. A continuous process which comprises the substantially continuous deposit of molten welding metal in a joint between the parts to be welded and in a position in which the molten material tends to flow by gravity from the side of the joint at which it is introduced, and abstracting heat solely from the surface of the molten material at the said side of the joint to congeal a skin of such material across the joint to constitute a dam restraining gravity flow from the joint and behind which the welding material remains molten, discontinuing the heat abstraction as soon as the skin has sufficiently congealed to support the molten material and progressively advancing the point of heat abstraction in correspondence with the deposit of molten welding material.

3. The process defined in claim 2, including the further step of maintaining the molten metal in the joint at a slag ejecting temperature and abstracting heat substantially solely from the ejected slag to constitute said slag as a dam without substantial heat abstraction from the molten welding metal.

4. The process defined in claim 2, including a simultaneous abstraction of heat from the molten material in said joint at the side thereof opposite to the side at which the molten welding metal is introduced.

5. A continuous welding process for closing a joint between the adjacent edges of substantially upright sheets of metal, said process comprising maintaining a puddle of welding metal and slag in the joint at slag ejecting temperature, substantially continuously advancing said puddle, and substantially continuously abstracting heat substantially solely from the slag at a side surface of the puddle, the point of heat abstraction being advanced correspondingly with the advance of the puddle and being discontinued substantially as soon as the slag has congealed at the lateral surface of the puddle sufficiently to constitute a dam behind which the welding metal remains molten.

6. A method of welding which comprises advancing a heat absorbing block along a joint to be welded, establishing in said joint in proximity to said block a puddle of molten weld material, flux, and slag, maintaining said puddle at a slag ejecting temperature, said block congealing said slag at the surface of the puddle at the face of the joint, regulating the rate of block advance along the joint in inverse ratio to the heat removed from the puddle by the block, feeding a weld rod electrode to the puddle at a rate to advance the puddle in the joint at the rate at which the block is advanced while maintaining an arc between the weld rod and the puddle, and increasing and decreasing the rate of feeding such electrode toward the puddle in accordance with increases and decreases of voltage, whereby to maintain a substantially constant voltage across said arc.

7. A welding tool comprising the combination with a weld rod electrode extending into the face of the joint to be welded to form a molten puddle, of a block of heat conductive material comprising a chill, means supporting the block for advance along the joint in spaced relation to the joint, means supporting the electrode for movement along the joint in advance of the block and projecting beyond the block into the joint, means for advancing the block and electrode, regulating mechanism for the advancing means, and means for circulating a coolant in heat exchange relation to the block to receive heat therefrom during block advance, said regulating mechanism comprising a thermostatic control subject to the temperature of coolant which has received heat from the block.

8. A welding tool comprising a block of heat absorbing metal adapted to be moved along the joint between ferrous metal parts to be welded, and a carriage for said block comprising means for riding upon the parts to be welded and magnetic means mounted on the carriage for holding the first mentioned means in operative relation to said parts.

9. A welding tool comprising the sub-combination of a wheeled carriage having wheels, magnetic poles in proximity to the surface of work traversed by said wheels for attracting said surface, and means for electrically energizing said poles with sufficient energy to hold the carriage to the work independently of gravity, said wheels being disposed to sustain the carriage against the electromagnetic attraction.

10. A welding tool comprising a heat absorbing block adapted to be moved along a joint in the process of welding for the absorption of heat therefrom, means for moving the block, and means for controlling such movement and including a temperature responsive device exposed to heat which is a function of the heat absorbed from the joint.

11. A welding device including a heat absorbing block adapted to be moved along a joint in welding, means for guiding the block, means for moving the block, and means for controlling the block movement at a rate inversely proportioned to the heat received by the block from the joint traversed thereby.

12. The structure of claim 11 in conjunction with a weld rod electrode, and means for advancing said electrode respecting said joint at a rate to maintain in said joint a puddle of molten material substantially at a predetermined level respecting said block and at a substantially constant temperature.

13. An automatic welder comprising an electrode and means for supplying weld material, in combination with means for advancing said electrode automatically in accordance with the progress of the weld, said means including a motor and a control member for the motor positioned in the slag carried by the puddle and engageable by the puddle itself as the puddle advances, said member being connected with the motor to energize the motor when said member is contacted by the puddle and to decrease the energization of the motor when said member is contacted only by the slag.

14. The device of claim 13 in which such member comprises an electrical contact.

15. The device of claim 13 in which such member comprises a thermostat.

16. In a welding apparatus, a heat absorbing chill, a carriage therefor, and means providing a biasing connection from the carriage to the chill, said means comprising links so inclined away from the surface traversed by the carriage that the weight of the chill provides the bias for urging the chill toward such work.

17. In a welding outfit, the combination with a carriage comprising electromagnetic means having poles extending toward the surface traversed by the carriage, of a tube extending obliquely between said poles for delivering weld material to the work, and a chill connected with the carriage and disposed opposite the end of the tube.

18. A welding tool comprising the combination with a carriage, of a chill having a surface rounded in a direction longitudinally of the joint to be welded and adapted to operate in immediate proximity to the weld and thence having a surface gradually divergent substantially immediately from the rounded surface aforesaid and from the work whereby to afford clearance for a bulging skin of flux congealed by said rounded surface, and means connecting said chill with said carriage comprising means for holding said chill in operative relation to the approximately upright surface of work to be welded.

19. A welding tool for use at the open face of a joint in which weld metal is progressively introduced to be congealed at its surface to form a dam behind which molten weld metal bulges the congealed weld metal under control of the tool, said tool comprising an elongated chill block of highly heat-conductive metal having a longitudinally convex work engaging surface merging substantially directly with an elongated inclined surface for supporting bulging weld metal, said block being provided with guide means spaced from said convex surface for locating said supporting surface in a position slightly divergent from the work engaged by said convex surface, whereby to permit controlled bulging of the congealed weld metal behind the convex surface as said block is advanced.

20. A method of welding a joint which consists in depositing molten weld metal progressively in the joint, progressively moving a chill along the joint in heat-abstracting relation to weld metal deposited therein, determining fluctuations in heat delivered off from the molten weld metal, and controlling the rate of chill advance and the rate of depositing molten weld metal inversely in accordance with fluctuations in heat so delivered, accelerating the chill movement in accordance with a decrease in heat and retarding the chill movement in accordance with an increase in heat.

ERWIN A. CHMIELEWSKI.